May 22, 1956 R. E. AYERS 2,746,231
HARVESTER MACHINE AND SICKLE GUARD EXTENSION THEREFOR
Filed Dec. 5, 1952
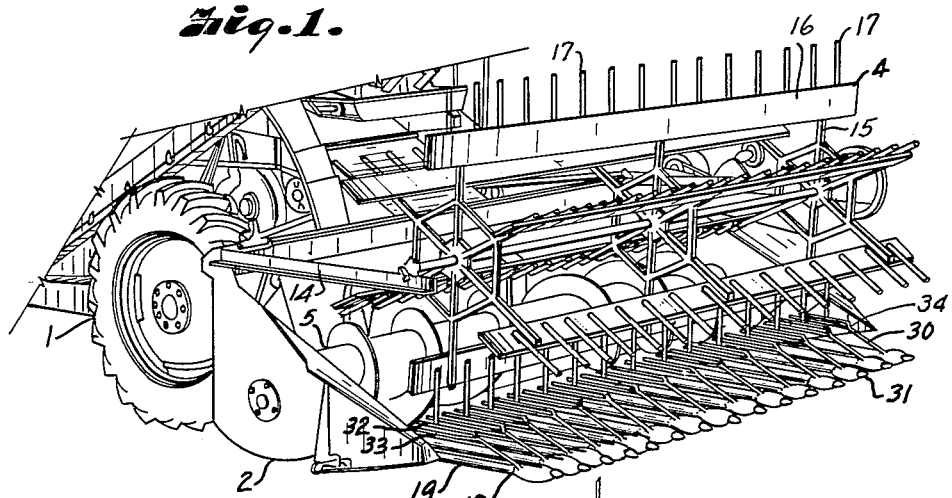
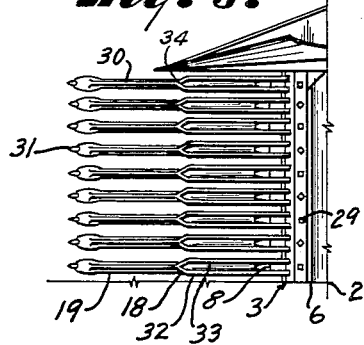
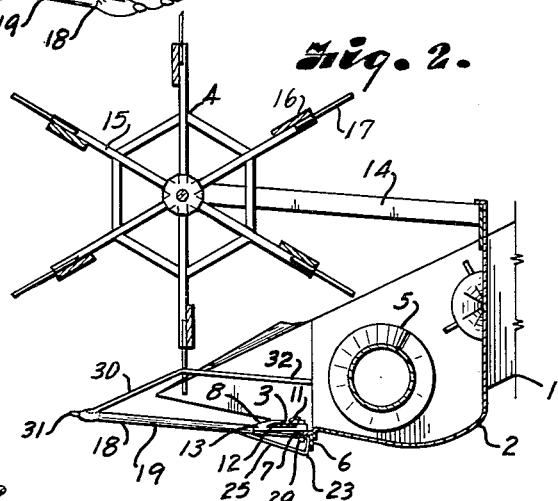
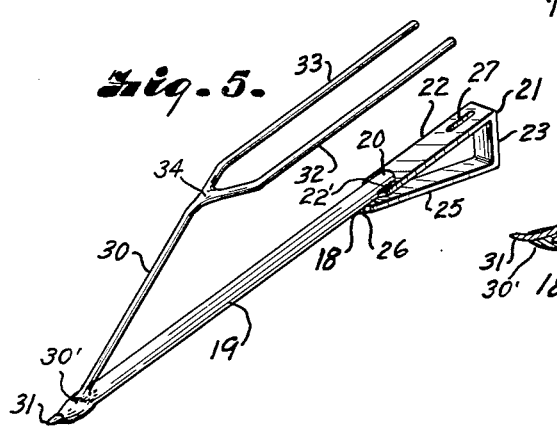
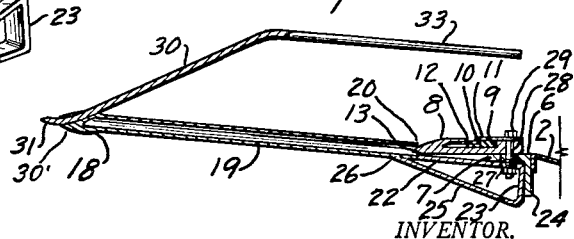
INVENTOR.
Roy E. Ayers.
BY
Fishburn & Mullendore
ATTORNEYS.

United States Patent Office 2,746,231
Patented May 22, 1956

2,746,231

HARVESTER MACHINE AND SICKLE GUARD EXTENSION THEREFOR

Roy E. Ayers, Woodward, Okla.

Application December 5, 1952, Serial No. 324,165

1 Claim. (Cl. 56—318)

This invention relates to harvesting machines such as combines and the like and more particularly to a harvester machine and sickle guard extension therefor for picking up down, matted, and entangled grain and like crops for movement to the sickle and supporting the cut crop for movement into the grain pan or other crop receiving device.

In harvesting entangled or down crops with a combine or other harvesting machines it is customary to lower the grain pan and sickle thereon into close proximity to the ground in an effort to harvest as much of the crop as possible. Some grain or the like that is cut by the sickle is so entangled with other stems, that are down to the extent that the sickle does not reach them, is pulled back and falls on or in front of the sickle out of the path of the harvester reel and the harvester fails to gather all of the grain. Also the entangled stems, vines, and the like tend to clog the operation of the sickle. When harvesting maize and like crops it is necessary for the harvester to move slower than when harvesting wheat. This slow speed results in some of the cut maize falling on or in front of the sickle instead of in the harvester pan. This also results in clogging of the sickle and loss of the grain falling in front of the sickle. There have been pick-up extension guards arranged at spaced points across harvester sickles, and while such extension guards will pick up some down grain they fail to properly support the grain for cooperation with the reel for movement of the grain into the combine or harvester pan.

The objects of the invention are to provide a harvester with a plurality of sickle guard extensions which pick up down grain and resiliently support same above the sickle for engagement by the reel whereby said reel pushes the cut grain into the harvester pan; to provide a sickle guard extension suitably secured to the sickle structure or grain pan and having a member sloping rearwardly and upwardly from the forward end of the extension with spaced rearwardly extending fingers cooperating with other guard extension fingers for supporting the grain being cut by the sickle to prevent said cut grain from falling on and clogging the sickle; to provide a harvester with teeth on the reel arranged for movement between the guard extensions and/or fingers to aid in raking cut grain from the guard fingers into the harvester pan; to provide such a sickle guard extension with a hollow portion for lightness of weight and having an open rear end engaging over the point of the conventional guard; to provide a harvester sickle guard extension that is economical to manufacture and efficient in operation to pick up down and matted grain and support such cut grain above the sickle for movement by the reel into the harvester pan.

In accomplishing these and other objects of the present invention I have provided improved details of structure the preferred forms of which are illustrated in the accompanying drawing wherein:

Fig. 1 is a partial perspective view of a harvester having sickle guard extensions and a reel with teeth thereon.

Fig. 2 is a transverse sectional view through the forward portion of the harvester particularly illustrating the arrangement of the sickle, sickle guard extension, and reel.

Fig. 3 is a plan view of a portion of the sickle and sickle guard extensions thereon.

Fig. 4 is an enlarged longitudinal sectional view through the sickle and sickle guard extension particularly illustrating the mounting of the extension on the sickle.

Fig. 5 is an enlarged perspective view of the sickle guard extension.

Referring more in detail to the drawings:

1 designates a harvesting machine of the conventional combine type including a grain pan 2, a sickle 3 attached to the forward edge of the grain pan, a reel 4 for bringing the grain into engagement with the sickle and a conveyor 5, for discharging cut grain into the separating mechanism in the usual manner.

In the structure illustrated, an angle bar 6 is fixed to and extends along the forward edge of the grain pan, said angle bar being arranged to provide a forwardly extending flange 7 on which the sickle structure 3 is mounted. The sickle structure includes guards 8 which extend forwardly of a track 9 which is secured to the flange 7. A knife back 10 is reciprocally mounted on the track and held in place by guides 11. The knife back extends substantially the length of the grain pan and is provided with conventional cutter blades 12 that are movable over guard teeth 8. The guard teeth 8 each have pointed forward ends 13 and there is one guard tooth for each sickle blade as in conventional structure. The mounting and arrangement of the sickle blades 12, guards 8, and guides 11, for the sickle are conventional.

The reel 4 is rotatably supported above the sickle on arms 14 carried by the frame of the grain pan, said reel mounting being such that the reel can be moved toward and away from the sickle as in conventional practice. The reel is rotated to move the grain into contact with the sickle as the harvester is moved forwardly through the field. The reel has a plurality of radially extending arms 15 on the outer ends of which are carried across bars 16 for sweeping grain into the sickle and grain pan. A plurality of spaced teeth 17 are fixed to the cross bars 16 and extend radially of the reel for cooperation with the guard extensions 18 now to be described.

The guard extensions 18 each consists of a tubular member or tine 19 having an open rear end 20 adapted to extend over the pointed end 13 of the conventional guard 8. A bracket 21 preferably formed from a flat bar has a portion 22 arranged substantially parallel to the tubular member 19 with the forward end of the portion 22 secured as by welding 22' to the bottom of the tubular member adjacent the rear end thereof. The bar portion 22 extends in line with the tubular member 19 rearwardly thereof and terminates in a downwardly turned portion 23 which preferably engages a forward face of the depending flange 24 of the angle 6. The bracket portion 23 extends slightly below the flange 24 and terminates in a forwardly and upwardly sloping portion 25, the forward end of which is suitably secured as at 26 to the tubular member adjacent the forward end of the bracket portion 22. The bracket portion 22 has a slotted aperture 27 for registry with an aperture 28 in the flange 7 of the angle 6 whereby the fastening device 29 which secures the sickle to the flange 7 also secures the bracket 21 to the angle whereby the tubular member 19 is in alignment with the respective guard 8 and extends forwardly therefrom, the tubular member being of suitable length to extend a substantial distance forwardly of the sickle as illustrated in Fig. 2.

A rod or bar 30 is suitably secured as by welding 30' to the forward end of the tubular member 19, said rod preferably having a curved forward end to provide a point 31 for facilitating entry of the guard extension into the entangled grain. The rod 30 slopes upwardly and rearwardly from the forward end of the tubular member 19 and terminates approximately midway the length of the tubular member 19, in a pair of rearwardly directed parallel fingers 32 and 33, the rear ends of which extend over the rear of the sickle in vertically spaced relation thereto, said fingers preferably being substantially parallel to the tubular member. The forward portions of the fingers 32 and 33 are turned inwardly whereby said forward portions cooperate to form a V-shape, the apex 34 of which is connected to the rear end of the rod 30.

In conventional sickles the spacing between the points of the blades 12 and guards 8 is usually three inches. It is preferable that a guard extension 18 be arranged to extend forwardly from each of the guards 8 and that the spacing between the fingers 32 and 33 be one-half the spacing of the guards 8. Therefore, when used on the usual sickle it is preferable that the spacing between the fingers 32 and 33 be one and one-half inches. It is preferable that the rod 30 and fingers 32 and 33 be resilient to provide a resilient support for grain and prevent any entangled grain supported on the rod and fingers from forming an obstruction to the sweep of the cross bars 16 of the reel 4. It is preferable that the teeth 17 be arranged on the reel whereby the teeth will pass between the guard extensions to aid in raking any grain supported on the fingers 32 and 33 into the grain pan 2.

In operating a structure assembled as described, the grain pan is adjusted to a desired height depending upon the character of the grain to be harvested and then as the harvester is moved forwardly through the field, the pointed ends 31 of the guard extensions enter under vines or stems of the grain and the upwardly and rearwardly sloping rods 30 tend to lift said vines or stems and the rotating reel tends to move same rearwardly to the sickle and grain pan. As the sickle cuts the lifted grain portions of the cut grain will tend to fall forwardly of or on the sickle; but such cut portions will be caught and supported by the plurality of fingers 32 and 33 and the rotating reel 4 and teeth 17 thereon will sweep such supported grain into the grain pan whereby the conveyor 5 may move same into the separating mechanism.

It is believed obvious I have provided a combine with an arrangement of guard extensions which will efficiently pick up and support grain for cutting and movement into the grain pan and increase the yield from down grain.

What I claim and desire to secure by Letters Patent is:

In a harvester having a grain pan, a sickle structure including spaced guards on the forward edge of the grain pan and a reel rotated above and forward of the sickle to sweep grain crops into the sickle and grain pan, a plurality of guard extensions each consisting of an elongate tine member having a hollow open rear end portion engaged over the forward end of a sickle guard, a bracket fixed to the tine member adjacent the rear end thereof and extending rearwardly therefrom, means securing the bracket to the sickle structure whereby the tine member extends forwardly substantially in line with the respective sickle guard, said tine having a forward pointed end, a resilient rod fixed to the tine member adjacent the forward end thereof and sloping upwardly and rearwardly thereof and terminating in a rearwardly directed V-shaped portion substantially above and midway the length of the tine member, spaced parallel resilient fingers on the V-shaped portion of the rod and extending therefrom over and rearwardly of the sickle in substantially parallel vertically spaced relation to the tine member for supporting grain to be swept by the reel into the grain pan, said spaced parallel resilient fingers having a spacing equal to substantially one-half the spacing of the spaced guards of the sickle structure, and a plurality of longitudinally spaced radially extending teeth on the reel for movement between the guard extensions to aid in sweeping grain supported on the fingers thereof into the grain pan.

References Cited in the file of this patent
UNITED STATES PATENTS

| | | |
|---|---|---|
| 665,231 | Koch | Jan. 1, 1901 |
| 1,231,690 | Anderson | July 3, 1917 |
| 1,996,294 | Hume et al. | Apr. 2, 1935 |
| 2,261,118 | Kanehl | Nov. 4, 1941 |
| 2,298,121 | Grimes | Oct. 6, 1942 |
| 2,618,114 | Gaterman | Nov. 18, 1952 |